(12) United States Patent
Yamamoto et al.

(10) Patent No.: US 8,669,002 B2
(45) Date of Patent: Mar. 11, 2014

(54) MICROPOROUS FILM

(75) Inventors: Yasuhiro Yamamoto, Chiba (JP); Hitoshi Satou, Chiba (JP); Kazuyuki Fukudome, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/531,599

(22) Filed: Jun. 25, 2012

(65) Prior Publication Data

US 2013/0005845 A1 Jan. 3, 2013

(30) Foreign Application Priority Data

Jun. 30, 2011 (JP) ................................. 2011-145225

(51) Int. Cl.
*C08F 110/06* (2006.01)
*B29C 47/00* (2006.01)

(52) U.S. Cl.
USPC .......... 429/145; 429/324; 264/41; 264/171.1; 521/61; 521/143

(58) Field of Classification Search
USPC ........................................................ 521/143
See application file for complete search history.

(56) References Cited

U.S. PATENT DOCUMENTS

| | | | |
|---|---|---|---|
| 3,426,754 A | 2/1969 | Bierenbaum et al. | |
| 3,679,538 A | 7/1972 | Druin et al. | |
| 3,745,057 A | 7/1973 | Loft et al. | |
| 3,843,761 A | 10/1974 | Bierenbaum et al. | |
| 3,920,785 A | 11/1975 | Druin et al. | |
| 4,563,317 A | 1/1986 | Kamei et al. | |
| 4,620,956 A | 11/1986 | Hamer | |
| 4,994,335 A | 2/1991 | Kamei et al. | |
| 5,173,235 A | 12/1992 | Kamei et al. | |
| 5,800,758 A * | 9/1998 | Topolkaraev et al. | 264/154 |
| 6,953,510 B1 * | 10/2005 | Mackay et al. | 156/229 |
| 2003/0031924 A1 * | 2/2003 | Lee et al. | 429/142 |
| 2011/0195295 A1 * | 8/2011 | Manago et al. | 429/145 |

FOREIGN PATENT DOCUMENTS

| | | |
|---|---|---|
| EP | 0565938 | 10/1993 |
| JP | 01-270907 | 10/1989 |

OTHER PUBLICATIONS

"LLDPE—General Properties" in "Polymers: A Property Database" available online at: www.polymersdatabase.com. Polymers 2011 copyright 2013 Taylor & Francis Group.*
"Polypropylene—General Properties" in "Polymers: A Property Database" available online at: www.polymersdatabase.com. Polymers 2011 copyright 2013 Taylor & Francis Group.*
"Search Report of European Counterpart Application", issued on Nov. 30, 2012, p. 1-p. 6.

* cited by examiner

*Primary Examiner* — Randy Gulakowski
*Assistant Examiner* — Christian Wales
(74) *Attorney, Agent, or Firm* — Jianq Chyun IP Office

(57) ABSTRACT

To provide a thermoplastic resin microporous film being difficult in longitudinal tearing and excellent in tear resistance; a microporous film comprising a thermoplastic resin, wherein a melt flow rate of the thermoplastic resin in the microporous film is in the range of 0.1 to 2.0 g/10 min, tensile strength in a cross-machine direction is in the range of 5 to 10 MPa and tensile elongation in the cross-machine direction is 300% or more.

4 Claims, No Drawings

MICROPOROUS FILM

CROSS-REFERENCE TO RELATED APPLICATION

This application claims the priority benefit of Japan application serial no. 2011-145225, filed on Jun. 30, 2011, and Japan application serial no. 2012-093927, filed on Apr. 17, 2012. The entirety of each of the above-mentioned patent applications is hereby incorporated by reference herein and made a part of this specification.

TECHNICAL FIELD

The present invention relates to a thermoplastic resin microporous film having an excellent tear resistance.

BACKGROUND ART

A microporous film is applied in various fields. Among the microporous films, a thermoplastic resin microporous film is widely applied in various fields, such as a separation membrane used for filtration or separation for a medical or industrial use, a hygienic material such as a backsheet for a disposable diaper, and a building material such as a house wrap and a roofing base material. In particular, a polyolefin resin microporous film has resistance to an organic solvent or an alkaline or acidic solution, and therefore is widely and suitably applied in the fields.

As an industrial process for manufacturing the polyolefin resin microporous film, two processes, namely, a phase separation process (wet process) and a stretching process (dry process) are generally well known.

In the wet process, the microporous film is formed by mixing a polymer and a solvent at a high temperature to prepare a homogeneous solution, processing the homogeneous solution into a film according to a T-die process, an inflation process or the like, and extracting and removing the solvent using a different volatile solvent, and then stretching the resultant film.

In the wet process, a porous structure can be controlled depending on a way of combining the polymer and the solvent, and according to diversified stretching methods such as uniaxial stretching by roll stretching, successive biaxial stretching by roll stretching and tenter stretching, and simultaneous biaxial stretching by simultaneous biaxial tenter stretching, or a processing method as in a case where stretching is carried out in a state of containing the solvent before extraction, and a case where stretching is carried out after removing the solvent.

However, the wet process involves essential problems due to use of a large amount of solvent, such as a heavy environmental load and a high manufacturing cost.

In the dry process, a crystal structure having a high regularity is formed by extruding a melted polymer from a T-die or a circular die, processing an extruded polymer into a film at a high draft ratio, and then applying heat treatment. The dry process includes a method for forming a porous structure by subsequently applying cold stretching and further hot stretching to the film to delaminate a crystal interface and produce a pore space part between lamellas (hereinafter, referred to as "single-ingredient stretching process"), and a method for generating voids (pores) in an interface between different kinds of polymers by mixing polyethylene, polypropylene and so forth to mold a sheet, and stretching the sheet at least in one direction. The former method is disclosed in Patent literatures Nos. 1 to 5 and so forth.

CITATION LIST

Patent Literature

Patent literature No. 1: JP S55-32531 B (U.S. Pat. No. 3,426,754, U.S. Pat. No. 3,920,785).
Patent literature No. 2: JP H2-11620 B (U.S. Pat. No. 4,563,317).
Patent literature No. 3: JP H6-18915 B (U.S. Pat. No. 4,620,956).
Patent literature No. 4: JP H6-76502 B (U.S. Pat. No. 4,994,335, U.S. Pat. No. 5,173,235).
Patent literature No. 5: JP H6-79659 B (JP H1-270907 A).

In a dry process, no solvent is used. Therefore, an environment load can be kept low and a manufacturing cost can also be kept low. In particular, a single-ingredient stretching process attracts attention because the process is very simple, in which neither a preliminary treatment such as mixing of resins is necessary nor a stretching apparatus in a cross-machine direction is needed.

However, in the single-ingredient stretching process, stretching per se dominates pore formation as a principle of the process. Therefore, the process involves problems wherein characteristics of a resin that can be used are restricted, a range of a porous structure that can be formed is narrow, a pore size or the like is limited, and furthermore, longitudinal tearing is easily caused and tear resistance is poor due to a very strong orientation in one direction.

As a method for solving the problems, a technique for improving strength by using a resin having a low melt flow rate as a raw material (wherein the melt flow rate as the raw material is abbreviated as "MFR as material" hereinafter) is expected to be simple and effective. However, in a film forming step according to the single-ingredient stretching process that has been applied so far, an extruded resin is processed into a film under a condition of a high draft ratio. Therefore, a stable production is difficult for the resin having the low MFR as material. Moreover, in the case where the extruded resin is processed into the film under a condition of a low draft ratio for achieving the stable production, crystallization is insufficiently caused and development of porous characteristics as a porous film becomes difficult. Thus, the problems have not been solved.

SUMMARY OF THE INVENTION

Technical Problem

An object of the invention is to provide a microporous film having a significantly improved tear resistance in the microporous film to be manufactured according to a single-ingredient stretching process using a resin having a low MFR as material, more specifically, to provide a microporous film having flexibility and an excellent strength by having a proper tensile strength and a large tensile elongation in a cross-machine direction.

Solution to Problem

The inventors of the invention have diligently continued to conduct research on a material and physical properties in a microporous film, as a result, have found that the microporous film has flexibility and an excellent strength when the microporous film is prepared using a resin to have a melt flow rate of a thermoplastic resin in a manufactured microporous film (hereinafter, referred to as an MFR as film) in the range of approximately 0.1 to approximately 2.0 g/10 min, and in a prepared microporous film, tensile strength in a cross-machine direction is in the range of approximately 5 to approximately 10 MPa and tensile elongation in the cross-machine direction is approximately 300% or more, and thus have completed the invention based on the finding.

The following items 1 to 8 constitute the present invention.

1. A microporous film comprising a thermoplastic resin, wherein a melt flow rate of the thermoplastic resin in the microporous film is in the range of approximately 0.1 to approximately 2.0 g/10 min, tensile strength in a cross-machine direction is in the range of approximately 5 to approximately 10 MPa and tensile elongation in the cross-machine direction is approximately 300% or more.

2. A microporous film manufactured by extruding a crystalline thermoplastic resin from a die, further applying heat treatment, and cold stretching and subsequent hot stretching in a machine direction to an extruded film, the microporous film according to item 1, wherein the microporous film is manufactured according to a method in which a draft ratio during resin extrusion from the die is in the range of approximately 20 to approximately 150, a heat treatment temperature is in the range of a temperature lower by approximately 10° C. than the melting point of the crystalline thermoplastic resin to a temperature less than the melting point, and a period of time of heat treatment is in the range of approximately 3 to approximately 15 minutes.

3. The microporous film according to item 2, wherein the draft ratio during resin extrusion from the die is in the range of approximately 20 to approximately 50.

4. The microporous film according to item 2 or 3, wherein the crystalline thermoplastic resin used as a raw material of the microporous film is a polyolefin resin, weight average molecular weight/number average molecular weight of the polyolefin resin is in the range of approximately 4 to approximately 15, and an isothermal crystallization time at a temperature lower by 25° C. than the melting point is approximately 200 seconds or less.

5. The microporous film according to any one of items 2 to 4, wherein the crystalline thermoplastic resin is a polypropylene resin, and density of a nonporous film after heat treatment is in the range of approximately 0.912 to approximately 0.916.

6. A method for manufacturing a microporous film by extruding a crystalline thermoplastic resin from a die, further applying heat treatment, and cold stretching and subsequent hot stretching in a machine direction to an extruded film, wherein a draft ratio during resin extrusion from the die is in the range of approximately 20 to approximately 150, a heat treatment temperature is in the range of a temperature lower by approximately 10° C. than a melting point of the crystalline thermoplastic resin to a temperature less than the melting point, and a period of time of heat treatment is in the range of approximately 3 to approximately 15 minutes.

7. The method for manufacturing the microporous film according to item 6, wherein the draft ratio during resin extrusion from the die is in the range of approximately 20 to approximately 50.

8. A microporous film to be manufactured according to the method according to item 6 or 7.

Advantageous Effects of Invention

According to the invention, a microporous film having flexibility and a high strength and having a proper tensile strength and a large tensile elongation in a cross-machine direction can be provided.

DESCRIPTION OF EMBODIMENTS

Hereinafter, an embodiment of the invention will be explained, but the invention is not limited thereto.

The invention provides a novel microporous film having characteristics of flexibility and a high strength, in which a specific MFR as film is in the range of approximately 0.1 to approximately 2.0 g/10 min, tensile strength in a cross-machine direction is in the range of approximately 5 to approximately 10 MPa and tensile elongation in the cross-machine direction is approximately 300% or more.

The invention also provides a microporous film having flexibility and a high strength, in which the microporous film can be manufactured by suitably combining a specific crystalline thermoplastic resin, and according to a single-ingredient stretching process having a feature of film formation at a low draft ratio and heat treatment.

In order to satisfy an MFR as film in the range of approximately 0.1 to approximately 2.0 g/10 min according to the invention, an MFR as material of a crystalline thermoplastic resin to be used as a raw material is preferably in the range of approximately 0.1 to approximately 1.9 g/10 min in which both processability and a sufficient strength as a porous film can be easily satisfied. If the MFR as material is approximately 0.1 g/10 min or more, flowability during melting of the resin is good to facilitate processing of the resin. If the MFR as material is approximately 1.9 g/10 min or less, a good strength as the microporous film can be easily obtained.

In the invention, the MFR as film and the MFR as material have been measured under conditions of a temperature of 230° C. and a nominal load of 2.16 kg in accordance with JIS K7210.

The crystalline thermoplastic resin may be one kind of crystalline thermoplastic resin or a crystalline thermoplastic resin composition prepared by combining two or more kinds of crystalline thermoplastic resins, if the conditions described above are satisfied. Specific examples of the crystalline thermoplastic resin include a polyolefin such as polyethylene and polypropylene. The crystalline thermoplastic resin may also be used in the form of a copolymer of ethylene, propylene and so forth, or a blend by blending two or more kinds of homopolymers, one of the homopolymers and the copolymer, or the copolymers.

A polypropylene resin used in the invention is a crystalline polymer mainly including a propylene polymerization unit, preferably, polypropylene containing approximately 90% by weight or more of the propylene polymerization unit based on the total weight. Specifically, the polypropylene resin may be a propylene homopolymer, or a random or block copolymer containing approximately 90% by weight or more of the propylene polymerization unit and approximately 10% by weight or less of ethylene or α-olefin other than ethylene and propylene. Specific examples of olefins used in the case of the copolymer of a crystalline polypropylene include ethylene, 1-butene, 1-pentene, 1-hexene, 1-octene, 1-decene, 1-dodecene, 4-methyl-1-pentene and 3-methyl-1-pentene. Among the polypropylene resins, the propylene homopolymer is preferably used in view of manufacturing cost.

Specific examples of a polyethylene resin used in the invention include an ethylene homopolymer, a binary or multinary random or block copolymer with a monomer other than ethylene in which ethylene is contained as a main ingredient, and a mixture of two or more kinds of the polyethylene resins. In the invention, "main ingredient" means an ingredient contained in the largest amount. The monomer other than ethylene is not particularly limited, but specific examples include an α-olefin having 3 to 12 carbons, such as propylene, 1-butene, 1-pentene, 1-hexene and 1-octene, a vinyl ester such as vinyl acetate, an acrylic acid ester such as ethyl acrylate, a methacrylic acid ester such as methyl methacrylate, and carbon monoxide. The monomers may be used alone or in combination of two or more kinds.

A polyolefin resin such as the polypropylene resin and the polyethylene resin to be used in the invention can be compounded with an antioxidant, a neutralizer, an inorganic filler and an antiblocking agent, a slipping agent, an antistatic agent, an α-form nucleating agent, a surface active agent or the like to be used for an ordinary polyolefin resin, where necessary.

Specific examples of the antioxidant include a phenolic antioxidant such as tetrakis[methylene-3-(3',5'-di-t-butyl-4'-hydroxyphenyl)propionate]methane, 2,6-di-t-butyl-4-methyl phenol, n-octadecyl-3-(3',5'-di-t-butyl-4'-hydroxyphenyl)propionate and tris(3,5-di-t-butyl-4-hydroxybenzyl) isocyanurate, or a phosphoric antioxidant such as tris(2,4-di-t-butylphenyl)phosphite, tris(nonylphenyl)phosphite, distearyl pentaerythritol diphosphite and tetrakis(2,4-di-t-butylphenyl)-4,4'-biphenylene diphosphonite.

Specific examples of the neutralizer include higher fatty acid salts such as calcium stearate. Specific examples of the inorganic filler and the antiblocking agent include calcium carbonate, silica, hydrotalcite, zeolite, aluminum silicate and magnesium silicate. Specific examples of the slipping agent include higher fatty acid amides such as stearic acid amide. Specific examples of the antistatic agent include fatty acid esters such as glycerol monostearate.

Specific examples of the α-form nucleating agent include a publicly known α-form nucleating agent, such as talc, aluminum hydroxy-bis(4-t-butylbenzoate), 1.3,2.4-dibenzylidene sorbitol, 1.3,2.4-bis(p-methylbenzylidene)sorbitol, 1.3,2.4-bis(p-ethylbenzylidene)sorbitol, 1.3,2.4-bis(2',4'-dimethylbenzylidene)sorbitol, 1.3,2.4-bis(3',4'-dimethylbenzylidene) sorbitol, 1.3-p-chlorobenzylidene-2.4-p-methylbenzylidene sorbitol, 1.3,2.4-bis(p-chlorobenzylidene)sorbitol, sodium-bis(4-t-butylphenyl)phosphate, sodium-2,2'-methylene-bis (4,6-di-t-butylphenyl)phosphate, calcium-2,2'-methylene-bis(4,6-di-t-butylphenyl)phosphate and aluminum dihydroxy-2,2'-methylene-bis(4,6-di-t-butylphenyl)phosphate. The α-form nucleating agents may be used alone or in combination of two or more kinds.

Furthermore, in the polyolefin resin such as the polypropylene resin and the polyethylene resin to be used in the invention, in general, if a molecular weight distribution is broad, non-Newtonian characteristics are increased and processability is improved. Moreover, as the distribution is narrower, mechanical properties such as tensile strength and impact resistance are improved. From a standpoint of satisfying both the processability and the strength, weight average molecular weight/number average molecular weight (hereinafter, referred to as Mw/Mn sometimes) is preferably in the range of approximately 4 to approximately 15, an isothermal crystallization time at a temperature lower by 25° C. than a melting point is preferably approximately 200 seconds or less, further preferably, in the range of approximately 10 to approximately 200 seconds. If the isothermal crystallization time is in the above range, a balance between crystallization properties of the raw material and film forming properties at a low draft ratio is good to facilitate original film formation.

In measuring Mw/Mn according to the invention, Mw/Mn has been calculated as a ratio of the weight average molecular weight (Mw) to the number average molecular weight (Mn) as determined by measurement by means of gel permeation chromatography. As an apparatus, Alliance GPCV 2000 made by Waters Corporation has been used, and two columns (7.8 mm (ID)×30.0 cm (L)) of TSKgel GMH$_{HR}$-H(20) HT made by Tosoh Corporation have been used. Measurement has been carried out at 140° C. and a flow rate of 1 milliliter per minute using ortho-dichlorobenzene as a solvent.

In measuring the melting point according to the invention, DSC 822 made by Mettler-Toledo International Inc. has been used. A sample has been set according to an instruction manual of the apparatus, and then the melting point has been determined as a temperature of a peak top in an endothermic peak caused by melting of the sample when temperature has been increased from 10° C. to 230° C. at a rate of 20° C. per minute.

In measuring the isothermal crystallization time according to the invention, DSC 7-RS made by PerkinElmer Corporation has been used. A sample has been set according to an instruction manual of the apparatus, and then temperature has been increased up to 230° C. at a rate of 20° C. per minute and kept for 3 minutes until the sample has been fully melted. Then, the temperature has been decreased to a temperature lower by 25° C. than the melting point at a rate of 50° C. per minute. While keeping the sample at the temperature, a period of time from start of keeping the temperature to a peak top in an exothermic peak caused by crystallization of the sample has been measured, and the period of time has been determined as the isothermal crystallization time.

A method for manufacturing the microporous film of the invention comprises step (A) to step (C), further preferably, step (A) to step (D) as described below.

Step (A): A step for melting and kneading the raw material in an extruder, extruding a melted material from a die, cooling an extruded material and molding the extruded material into a film shape.

Step (B): A step for applying heat treatment to a film-shaped molded product obtained in step (A).

Step (C): A step for applying cold stretching and subsequent thermal stretching in a longitudinal direction to a nonporous film prepared in step (B).

Step (D): Subsequently to step (C), a step for applying heat treatment to the film subjected to thermal stretching while relaxing the film.

Step (A) to step (D) will be explained in detail.

In step (A), a publicly known film forming method using the polyolefin resin may be employed. For example, the film-shaped molded product can be formed according to a method such as a T-die film molding process and an inflation film molding process. The T-die film molding process is particularly preferred in view of a processing margin width.

In the case of the T-die film molding process and the inflation film molding process, the resin can be processed into the film at an extrusion molding temperature of approximately 180° C. or higher. The extrusion molding temperature in the range of approximately 220 to approximately 300° C. is suitably applied for the purpose of reducing pressure in the die and reducing the draft ratio described later, and for evening out resin melting unevenness.

A melted and kneaded resin is extruded from a die lip. On the occasion, the draft ratio ($V_{CL}/V_f$) is an important factor for achieving the invention, wherein the draft ratio ($V_{CL}/V_f$) is defined as a ratio of a linear velocity ($V_{CL}$) of a resin composition passing through the die lip in a machine direction (MD) to a linear velocity ($V_f$) of the film-shaped molded product in the machine direction (MD). In general, the draft ratio in the film forming step in the single-ingredient stretching process is approximately 200 or more. In a preferred embodiment of the invention, the draft ratio upon processing the resin into the film is in the range of approximately 20 to approximately 150. The draft ratio in a further preferred embodiment is in the range of approximately 20 to approximately 50. In the case of the draft ratio of approximately 20 or more, porosification in the stretching step is facilitated, and in the case of the draft ratio of approximately 150 or less, a stable film formation can be easily carried out even by using a low MFR resin. Thus, a uniform film can be stably formed even by using the low MFR resin.

Thickness of the film-shaped molded product obtained in the film forming step is not particularly limited, but is preferably in the range of approximately 10 micrometers to approximately 70 micrometers depending on stretching and heat treatment conditions in the next stretching step and required characteristics of the microporous film. A film forming velocity is suitably applied in the range of approximately 1 to approximately 100 meters per minute. The film-shaped molded product having the above thickness can be obtained using various kinds of film forming apparatuses including a T-die film molding apparatus, and a T-die film molding apparatus comprising a combination of a cooling roll and an air knife having an air nozzle, a cooling roll and a pair of metal rolls, and a cooling roll and a stainless steel belt.

In step (B), heat treatment should be applied for improving a degree of crystallinity of the film-shaped molded product before providing the product for the next step (C). Application of the heat treatment improves a degree of crystallinity of the film obtained in step (A), and thus a sufficient porosity as a porous film can be easily obtained in step (C). As a heat treatment method, application of the heat treatment is needed in the range of a temperature lower by approximately 10° C. than the melting point of the resin to a temperature less than the melting point for approximately 3 to approximately 15 minutes by means of hot-air circulation oven, a heating roll or a far-infrared heater, for example. For a heat treatment temperature, the film-shaped molded product is preferably treated at the temperature lower by approximately 10° C. than the melting point or above the temperature because the heat treatment is sufficient and productivity is not adversely affected. Moreover, if the temperature reaches the melting point, crystallinity of the resin is adversely affected easily. Therefore, the temperature is preferably less than the melting point. A heat treatment period of time is preferably approximately 3 minutes or more because a sufficient degree of crystallinity is easily achieved in step (C), and approximately 15 minutes or less because a high productivity can also be satisfied. If the heat treatment in step (B) runs short, generation of pores in the next step (C) is significantly reduced, and a sufficient performance as the porous film cannot be developed.

As a state of the heat treatment, if density of the nonporous film reaches approximately 0.912 or more in the case where the polypropylene homopolymer is subjected to the heat treatment, for example, the state is preferred because the film can be satisfactorily provided for the next step (C). The nonporous film having the density in the range of approximately 0.915 to approximately 0.916 can be particularly suitably used.

Film density in the invention has been calculated from a correlation between the density and a refractive index based on the refractive index measured by means of an Abbe refractometer (apparatus name: NAR-1T SOLID made by Atago Co., Ltd.).

In the low MFR resin that has been difficult to use so far, the low MFR resin is suitably treated under conditions of the draft ratio and the heat treatment described above. Thus, such a microporous film can be manufactured that the film has flexibility and a high strength and develops a sufficient performance as the porous film.

In step (C), cold stretching and subsequent hot stretching are applied to the nonporous film obtained in step (B). First, in cold stretching, the nonporous film is stretched in the machine direction (MD) under an atmosphere, preferably, in the range of approximately 15 to approximately 35° C., particularly preferably, in the range of approximately 15 to approximately 25° C. in order to reduce stretching unevenness and to obtain sufficient physical properties as the porous film. Moreover, a ratio on the occasion is particularly preferably in the range of approximately 1.1 to approximately 2.5 in order to suppress stretching unevenness and to obtain a uniform porous film. The film subjected to cold stretching is subsequently provided for hot stretching. As for a heating method, a general system for heating the film can be applied, for example, a hot-air circulation oven, a heating roll or a far-infrared heater. As hot stretching conditions, hot stretching is preferably applied at a ratio in the range of approximately 1.5 to approximately 3.0 in the machine direction (MD) under an environment controlled at a temperature lower by approximately 60° C. than the melting point to a temperature lower approximately 5° C. than the melting point, further preferably, a temperature lower by approximately 30° C. than the melting point to a temperature lower by approximately 5° C. than the melting point in order to suppress stretching unevenness and to obtain a uniform porous film.

In step (D), subsequently to step (C), thermal relaxation treatment of a porosified film is applied. The heat treatment is particularly preferably applied at a relaxation rate in the range of approximately 10% to approximately 40% under an environment controlled at a temperature lower by approximately 30° C. than the melting point to a temperature lower by approximately 5° C. than the melting point, for example, by means of a hot-air circulation oven, a heating roll or a far-infrared heater in order to keep a sufficient temperature stability as the microporous film and to suppress generation of wrinkles.

Depending on the raw material and the manufacturing process as described above, the microporous film of the invention can be obtained. More specifically, the microporous film having an MFR as film in the range of approximately 0.1 to approximately 2.0 g/min, tensile strength in a cross-machine direction in the range of approximately 5 to approximately 10 MPa, and tensile elongation in the cross-machine direction in the range of approximately 300% or more can be obtained.

The tensile strength of the microporous film in the cross-machine direction according to the invention is preferably in the range of approximately 5 to approximately 10 MPa in view of a balance between absolute strength and flexibility. Moreover, the tensile elongation in the cross-machine direction is preferably approximately 300% or more in view of a balance between flexibility and tear resistance.

Thickness of the microporous film in the invention is preferably in the range of approximately 5 to approximately 100 micrometers. For example, in the case where the microporous film is used as a filter, the film thickness is preferably in the range of approximately 5 to approximately 50 micrometers, further preferably, in the range of approximately 10 to approximately 30 micrometers if a balance between permeability and reliability is taken into consideration. Porosity is preferably in the range of approximately 30% to approximately 70%, further preferably, in the range of approximately 40% to approximately 60%. As a pore size, a maximum pore size is preferably in the range of approximately 35 to approximately 50 nanometers, and an average pore size is preferably in the range of approximately 10 to approximately 30 nanometers as a size for achieving reduced unevenness of permeability and avoiding clogging or the like.

The thermoplastic resin microporous film can be suitably used in various fields, such as a filtration membrane or a separation membrane for an air cleaning or water treatment purpose or a moisture permeability water-proof application for a building material and clothes in a manner similar to a porous film that has been used so far because the thermoplastic resin microporous film has an excellent balance among porous characteristics, tear resistance and cost.

Hereafter, the invention will be specifically explained by way of Examples and Comparative Examples, but the invention is in no way limited to the Examples.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Each of characteristics of a thermoplastic resin microporous film of the invention was evaluated according to the testing methods described below.

1. Film thickness: A microporous film was cut out into a circle having a diameter of 72 millimeters, and thickness was measured in arbitrary 15 places using a dial gauge (gauge head: diameter 5 mm, measuring load: 1.5 N) in accordance with A-2 process of JIS K7130 (1992). An average of values in 15 places was defined as the thickness.

2. Porosity: A microporous film was cut out into a square having a dimension of 100×100 millimeters, and bulk specific gravity was determined. True specific gravity was determined from a non-porosified sample having a dimension of 100×100 millimeters by means of an automatic gravimeter DENSIM-ETER, Model D-S made by Toyo Seiki Co., Ltd., and porosity was determined according to the following equation: porosity (%)=(1−bulk specific gravity/true specific gravity)×100.

3. Maximum pore size: A pore size of a thermoplastic resin microporous film was measured using Galwick and by means of Perm-Porometer made by PMI in accordance with ASTM F316, and a bubble-point pore size was defined as a maximum pore size.

4. Average pore size: Hexane vapor permeation performance was measured using helium as a carrier gas and by means of a nanopore size distribution measuring apparatus (apparatus name: Nano-Perm-Porometer) made by Seika Corporation, and a 50% permeation flow rate size was defined as an average pore size.

5. Tensile strength and tensile elongation: A microporous film was cut out into a rectangle having a dimension of 120 millimeters long×10 millimeters wide, and the rectangle was used as a sample. In addition, a machine direction (longitudinal direction) of 120 millimeters was aligned with a cross-machine direction (direction perpendicular to a stretching direction during manufacturing the film). A tensile tester (Strograph R-3 made by Toyo Seiki Co., Ltd.) was used. A tensile test was carried out in a film longitudinal direction by setting an initial interchuck distance at 50 millimeters and a tensile velocity at 300 millimeters per minute. A maximum stress applied to the film at break of the sample was defined as tensile strength, and a value determined from an interchuck distance at break, according to an equation: (interchuck distance at break/initial interchuck distance)×100 was defined as tensile elongation.

6. Tear resistance: A microporous film was cut out into a circle having a diameter of 72 millimeters, and the circle was fixed with a metal frame perforated at a diameter of 60 millimeters in a center for preventing movement in a circumference. When the sample was pushed in the center with a cylindrical rod having a diameter of 15 millimeters, a sample without longitudinal tear even at a push of 2.5 centimeters or more was defined as passed. Measurement was carried out using three samples, and the film was evaluated to be good when the number of samples passed was 3, marginal when the number of samples passed was 1 to 2, and bad when the number of samples passed was 0.

Preparation of a Microporous Film

Example 1

A T-die having a discharge width of 1,100 millimeters and a discharge lip opening of 1.2 millimeters was used. Melt extrusion was carried out at 210° C. using polypropylene having an MFR of 0.5, an isothermal crystallization time of 190 seconds, an Mw/Mn of 10 and a melting point of 163° C. (Novatec (registered trademark) EA9BT made by Japan Polypropylene Corporation). An original nonporous film was introduced into a cooling roll at 110° C. at a draft ratio of 32, and then rolled up. Film thickness was 31 micrometers.

Next, the resultant original nonporous film was introduced into a hot-air circulation oven, and subjected to heat treatment at 155° C. for 10 minutes under a tension of 5% so as to avoid slackening. On the occasion, density of the original film after heat treatment was 0.915.

The original film after heat treatment was introduced into an MD stretching apparatus, and subjected to roll stretching by 20% under a condition of a temperature controlled at 25° C. Subsequently, the resultant film was introduced into a thermal stretching bath controlled at 155° C., and subjected to thermal stretching between rolls to be a total stretching amount of 250%, and then relaxed by 20% at 120° C., and thus a microporous film was obtained.

Physical properties of the microporous film obtained are shown in Table 1.

Example 2

A T-die having a discharge width of 1,100 millimeters and a discharge lip opening of 1.6 millimeters was used. Melt extrusion was carried out at 210° C. using polypropylene having an MFR of 0.5, an isothermal crystallization time of 190 seconds, an Mw/Mn of 10 and a melting point of 163° C. (Novatec (registered trademark) EA9BT made by Japan Polypropylene Corporation). An original nonporous film was introduced into a cooling roll at 110° C. at a draft ratio of 35, and then rolled up. Film thickness was 45 micrometers. Manufacture was carried out in a manner similar to Example 1 except for the above conditions, and thus a microporous film was obtained.

Physical properties of the microporous film obtained are shown in Table 1.

Example 3

A T-die having a discharge width of 1,100 millimeters and a discharge lip opening of 1.2 millimeters was used. Melt extrusion was carried out at 180° C. using a polyethylene homopolymer having an MFR of 0.2, an isothermal crystallization time of 120 seconds, an Mw/Mn of 14 and a melting point of 133° C. An original nonporous film was introduced into a cooling roll at 80° C. at a draft ratio of 33, and then rolled up. Film thickness was 35 micrometers.

Next, the resultant original nonporous film was introduced into a hot-air circulation oven, and subjected to heat treatment at 125° C. for 10 minutes under a tension of 5% so as to avoid slackening. On the occasion, density of the original film after heat treatment was 0.955.

The original film after heat treatment was introduced into an MD stretching apparatus, and subjected to roll stretching by 20% under a condition of a temperature controlled at 25° C. Subsequently, the resultant film was introduced into a thermal stretching bath controlled at 125° C., and subjected to thermal stretching between rolls to be a total stretching amount of 250%, and then relaxed by 20% at 120° C., and thus a microporous film was obtained.

Physical properties of the microporous film obtained are shown in Table 1.

Example 4

A T-die having a discharge width of 1,100 millimeters and a discharge lip opening of 1.0 millimeter was used. Melt extrusion was carried out at 180° C. using a polyethylene homopolymer having an MFR of 0.2, an isothermal crystallization time of 120 seconds, an Mw/Mn of 14 and a melting point of 133° C. An original nonporous film was introduced into a cooling roll at 80° C. at a draft ratio of 40, and then rolled up. Film thickness was 25 micrometers. Manufacture was carried out in a manner similar to Example 3 except for the above conditions, and thus a microporous film was obtained.

Physical properties of the microporous film obtained are shown in Table 1.

Example 5

In a step for heat treatment of an original nonporous film, the film was subjected to heat treatment at 150° C. for 10 minutes under a tension of 5% so as to avoid slackening. On the occasion, density of the original film after heat treatment was 0.912. Manufacture was carried out in a manner similar to Example 1 except for the above conditions, and thus a microporous film was obtained.

Physical properties of the microporous film obtained are shown in Table 1.

Example 6

A T-die having a discharge lip opening of 1.6 millimeters was used. Melt extrusion was carried out at 210° C. using a polypropylene homopolymer having an MFR of 1.8, an isothermal crystallization time of 195 seconds, an Mw/Mn of 5 and a melting point of 160° C. An original nonporous film was introduced into a cooling roll at 110° C. at a draft ratio of 47, and then rolled up. Film thickness was 32 micrometers.

Next, the resultant original nonporous film was introduced into a hot-air circulation oven, and subjected to heat treatment at 155° C. for 10 minutes under a tension of 5% so as to avoid slackening. On the occasion, density of the original film after heat treatment was 0.915.

Manufacture was carried out in a manner similar to Example 1 except for the above conditions, and thus a microporous film was obtained.

Physical properties of the microporous film obtained are shown in Table 1.

Example 7

A T-die having a discharge width of 1,100 millimeters and a discharge lip opening of 3.5 millimeters was used. Melt extrusion was carried out at 210° C. using polypropylene having an MFR of 0.5, an isothermal crystallization time of 190 seconds, an Mw/Mn of 10 and a melting point of 163° C. (Novatec (registered trademark) EA9BT made by Japan Polypropylene Corporation). An original nonporous film was introduced into a cooling roll at 110° C. at a draft ratio of 133, and then rolled up. Film thickness was 29 micrometers.

Next, the resultant original nonporous film was introduced into a hot-air circulation oven, and subjected to heat treatment at 155° C. for 10 minutes under a tension of 5% so as to avoid slackening. On the occasion, density of the original film after heat treatment was 0.915.

Manufacture was carried out in a manner similar to Example 1 except for the above conditions, and thus a microporous film was obtained.

Physical properties of the microporous film obtained are shown in Table 1.

Comparative Example 1

A T-die having a discharge width of 1,100 millimeters and a discharge lip opening of 2.5 millimeters was used. Melt extrusion was carried out at 210° C. using polypropylene having an MFR of 0.5, an isothermal crystallization time of 190 seconds, an Mw/Mn of 10 and a melting point of 163° C. (Novatec (registered trademark) EA9BT made by Japan Polypropylene Corporation). An original nonporous film was introduced into a cooling roll at 110° C. at a draft ratio of 155, and then rolled up. Film thickness was 31 micrometers. However, the original nonporous film had a terrible thickness unevenness and could not be provided for any step thereafter.

Comparative Example 2

A T-die having a discharge width of 1,100 millimeters and a discharge lip opening of 1.2 millimeters was used. Melt extrusion was carried out at 210° C. using a polypropylene homopolymer having an MFR of 4.0, an isothermal crystallization time of 195 seconds, an Mw/Mn of 5 and a melting point of 161° C. An original nonporous film was introduced into a cooling roll at 110° C. at a draft ratio of 32, and then rolled up. Film thickness was 31 micrometers. Manufacture was carried out in a manner similar to Example 1 except for the above conditions, and thus a microporous film was obtained. On the occasion, density of the original film after heat treatment was 0.914.

Physical properties of the microporous film obtained are shown in Table 2.

Comparative Example 3

A T-die having a discharge width of 1,100 millimeters and a discharge lip opening of 4.0 millimeters was used. Melt extrusion was carried out at 200° C. using a polypropylene homopolymer having an MFR of 4, an isothermal crystallization time of 220 seconds, an Mw/Mn of 4 and a melting point of 161° C. An original nonporous film was introduced into a cooling roll at 90° C. at a draft ratio of 200, and then rolled up. Film thickness was 25 micrometers.

Next, the resultant original nonporous film was introduced into a hot-air circulation oven, and subjected to heat treatment at 125° C. for 1 minute under a tension of 5% so as to avoid slackening. On the occasion, density of the original film after heat treatment was 0.914.

The original film after heat treatment was introduced into an MD stretching apparatus, and subjected to roll stretching by 20% under a condition of a temperature controlled at 25° C. Subsequently, the resultant film was introduced into a thermal stretching bath controlled at 110° C., and subjected to thermal stretching between rolls to be a total stretching amount of 220%, and then relaxed by 20% at 120° C., and thus a microporous film was obtained.

Physical properties of the microporous film obtained are shown in Table 2.

TABLE 1

| Item | | Example 1 | Example 2 | Example 3 | Example 4 | Example 5 | Example 6 | Example 7 |
|---|---|---|---|---|---|---|---|---|
| Material MFR | g/10 min | 0.5 | 0.5 | 0.2 | 0.2 | 0.5 | 1.8 | 0.5 |
| Melting point | ° C. | 163 | 163 | 133 | 133 | 163 | 160 | 163 |
| Draft ratio | | 32 | 35 | 33 | 40 | 32 | 47 | 133 |
| State of formed film | | Good | Good | Good | Good | Good | Good | Good |
| Heat treatment temperature | ° C. | 155 | 155 | 125 | 125 | 150 | 155 | 155 |
| Heat treatment time | min | 10 | 10 | 10 | 10 | 10 | 10 | 10 |
| Density after heat treatment | g/cm³ | 0.915 | 0.915 | 0.955 | 0.955 | 0.912 | 0.915 | 0.915 |
| MFR as film | g/10 min | 1.0 | 1.0 | 0.2 | 0.4 | 1.0 | 2.0 | 1.0 |
| Film thickness | μm | 25 | 35 | 25 | 18 | 20 | 20 | 22 |
| Porosity | % | 42 | 40 | 45 | 44 | 20 | 35 | 43 |
| Maximum pore size | nm | ≤30 | ≤30 | ≤40 | ≤40 | ≤30 | ≤30 | ≤30 |
| Average pore size | nm | 12 | 11 | 20 | 9 | 22 | 11 | 12 |
| Tensile strength (TD) | MPa | 7 | 7 | 8 | 6 | 8 | 6 | 6 |
| Tensile elongation (TD) | % | 880 | 800 | 450 | 670 | 600 | 350 | 850 |
| Tear resistance | | Good | Good | Good | Good | Good | Good | Good |

TABLE 2

| Item | | Comparative Example 1 | Comparative Example 2 | Comparative Example 3 |
|---|---|---|---|---|
| MFR as material | g/10 min | 0.5 | 4 | 4 |
| Melting point | ° C. | 163 | 161 | 161 |
| Draft ratio | | 155 | 32 | 200 |
| State of formed film | | Bad | Good | Good |
| Heat treatment temperature | ° C. | — | 155 | 125 |
| Heat treatment time | min | — | 10 | 1 |
| Density after heat treatment | g/cm³ | — | 0.914 | 0.914 |
| MFR as film | g/10 min | — | 5 | 4.5 |
| Film thickness | μm | — | 24 | 18 |
| Porosity | % | — | 35 | 45 |
| Maximum pore size | nm | — | ≤30 | ≤30 |
| Average pore size | nm | — | 10 | 18 |
| Tensile strength (TD) | MPa | — | 6 | 4 |
| Tensile elongation (TD) | % | — | 600 | 250 |
| Tear resistance | | — | Marginal | Bad |

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

In a microporous film according to the invention, a microporous film having excellent characteristics, cost and tear resistance can be provided because the macroporous film has performance as a porous film and satisfies both flexibility and a high strength.

What is claimed is:

1. A microporous film comprising a thermoplastic resin, which is manufactured by extruding a crystalline thermoplastic resin from a die, further applying heat treatment, and cold stretching and subsequent hot stretching in a machine direction to an extruded film, wherein the microporous film is manufactured according to a method in which a draft ratio during resin extrusion from the die is in the range of 20 to 150, a heat treatment temperature is in the range of a temperature lower by 10° C. than the melting point of the crystalline thermoplastic resin to a temperature less than the melting point, and a period of time of heat treatment is in the range of 3 to 15 minutes, wherein a melt flow rate of the thermoplastic resin in the microporous film is in the range of 0.1 to 2.0 g/10 min, tensile strength in a cross-machine direction is in the range of 5 to 10 MPa and tensile elongation in the cross-machine direction is 300% or more, wherein the crystalline thermoplastic resin used as a raw material of the microporous film is a polyolefin resin, weight average molecular weight/number average molecular weight of the polyolefin resin is in the range of 4 to 15, and an isothermal crystallization time at a temperature lower by 25° C. than the melting point is 200 seconds or less.

2. The microporous film according to claim 1, wherein the draft ratio during resin extrusion from the die is in the range of 20 to 50.

3. The microporous film according to claim 1, wherein the crystalline thermoplastic resin is a polypropylene resin, and density of a nonporous film after heat treatment is in the range of 0.912 to 0.916.

4. The microporous film according to claim 2, wherein the crystalline thermoplastic resin is a polypropylene resin, and density of a nonporous film after heat treatment is in the range of 0.912 to 0.916.

* * * * *